United States Patent
Gruber et al.

(10) Patent No.: US 9,574,487 B2
(45) Date of Patent: Feb. 21, 2017

(54) METHOD FOR OPERATING AT LEAST ONE PRECOMBUSTION CHAMBER-FIRED INTERNAL COMBUSTION ENGINE

(71) Applicant: GE Jenbacher GmbH & Co OG, Jenbach (AT)

(72) Inventors: Friedrich Gruber, Hippach (AT); Guenther Wall, Bad Haering (AT)

(73) Assignee: GE JENBACHER GMBH & CO., OG, Jenbach (AT)

( * ) Notice: Subject to any disclaimer, the term of this patent is extended or adjusted under 35 U.S.C. 154(b) by 217 days.

(21) Appl. No.: 14/250,757

(22) Filed: Apr. 11, 2014

(65) Prior Publication Data

US 2014/0224208 A1    Aug. 14, 2014

Related U.S. Application Data

(63) Continuation of application No. PCT/AT2012/000247, filed on Oct. 2, 2012.

(30) Foreign Application Priority Data

Oct. 19, 2011   (AT) ................. A 1528/2011

(51) Int. Cl.
| | |
|---|---|
| *F02B 19/12* | (2006.01) |
| *F02B 19/10* | (2006.01) |
| *F02M 21/02* | (2006.01) |
| *F02D 19/02* | (2006.01) |
| *F02D 19/06* | (2006.01) |
| *F02D 35/02* | (2006.01) |
| *F02D 41/00* | (2006.01) |
| *F02P 17/12* | (2006.01) |

(52) U.S. Cl.
CPC .............. *F02B 19/12* (2013.01); *F02B 19/10* (2013.01); *F02D 19/022* (2013.01); (Continued)

(58) Field of Classification Search
CPC ........ Y02T 10/125; F02B 19/00; F02B 19/12; F02B 19/1023; F02B 19/1066; F02B 19/108; F02B 19/16; F02B 19/10; F02B 19/1019; F02D 19/022; F02D 19/0671; F02D 35/023; F02D 41/0027; F02D 19/0644; F02M 21/0227

See application file for complete search history.

(56) References Cited

U.S. PATENT DOCUMENTS

| | | | |
|---|---|---|---|
| 3,970,054 A | | 7/1976 | Henault et al. |
| 4,108,114 A | * | 8/1978 | Kosaka ................... C01B 3/366 |
| | | | 123/263 |

(Continued)

FOREIGN PATENT DOCUMENTS

| | | |
|---|---|---|
| CN | 101421495 | 4/2009 |
| DE | 1 096 113 | 12/1960 |

(Continued)

OTHER PUBLICATIONS

International Search Report (ISR) issued Apr. 25, 2013 in International (PCT) Application No. PCT/AT2012/000247.

(Continued)

*Primary Examiner* — Sizo Vilakazi
(74) *Attorney, Agent, or Firm* — Wenderoth, Lind & Ponack, L.L.P.

(57) ABSTRACT

The invention relates to a method for operating at least one precombustion chamber-fired internal combustion engine, in particular a stationary gas Otto cycle engine, having a pilot chamber and a main combustion chamber associated with the precombustion chamber, wherein a gas mixture is fed to the precombustion chamber as flushing gas, wherein a synthesis gas generated in a fuel reformer and a fuel from a fuel source are fed to the flushing gas and wherein a fuel and at least one further substance stream are fed to the fuel reformer for the reforming process, wherein at least one operating parameter of the at least one internal combustion engine is monitored, wherein in accordance with a change in the at least one operating parameter the chemical composi- (Continued)

tion of the flushing gas is modified by changing the mass stream of the at least one further substance stream.

17 Claims, 3 Drawing Sheets

(52) U.S. Cl.
CPC ..... *F02D 19/0644* (2013.01); *F02D 19/0671* (2013.01); *F02D 35/023* (2013.01); *F02D 41/0027* (2013.01); *F02M 21/0227* (2013.01); *F02P 2017/121* (2013.01); *Y02T 10/125* (2013.01); *Y02T 10/32* (2013.01); *Y02T 10/36* (2013.01)

(56) References Cited

U.S. PATENT DOCUMENTS

| | | | | |
|---|---|---|---|---|
| 5,154,142 | A * | 10/1992 | Kamo | ..................... F02B 19/14 123/1 A |
| 5,611,307 | A * | 3/1997 | Watson | ............... F02B 19/1014 123/254 |
| 6,739,289 | B2 | 5/2004 | Hiltner et al. | |
| 2003/0200939 | A1 * | 10/2003 | Hiltner | ................... F02B 43/10 123/3 |
| 2007/0235002 | A1 | 10/2007 | Blank | |
| 2009/0043479 | A1 * | 2/2009 | Noda | ..................... F02D 13/02 701/103 |
| 2013/0055985 | A1 | 3/2013 | Gruber et al. | |

FOREIGN PATENT DOCUMENTS

| | | |
|---|---|---|
| DE | 103 56 192 | 7/2005 |
| DE | 10 2010 029 972 | 12/2011 |
| EP | 2 025 903 | 2/2009 |
| GB | 1 454 723 | 11/1976 |
| WO | 93/08385 | 4/1993 |
| WO | 01/75294 | 10/2001 |
| WO | 2011/127494 | 10/2011 |

OTHER PUBLICATIONS

Austrian Patent Office Search Report (ASR) issued Mar. 13, 2012 in Austrian Patent Application A 1528/2011.

* cited by examiner

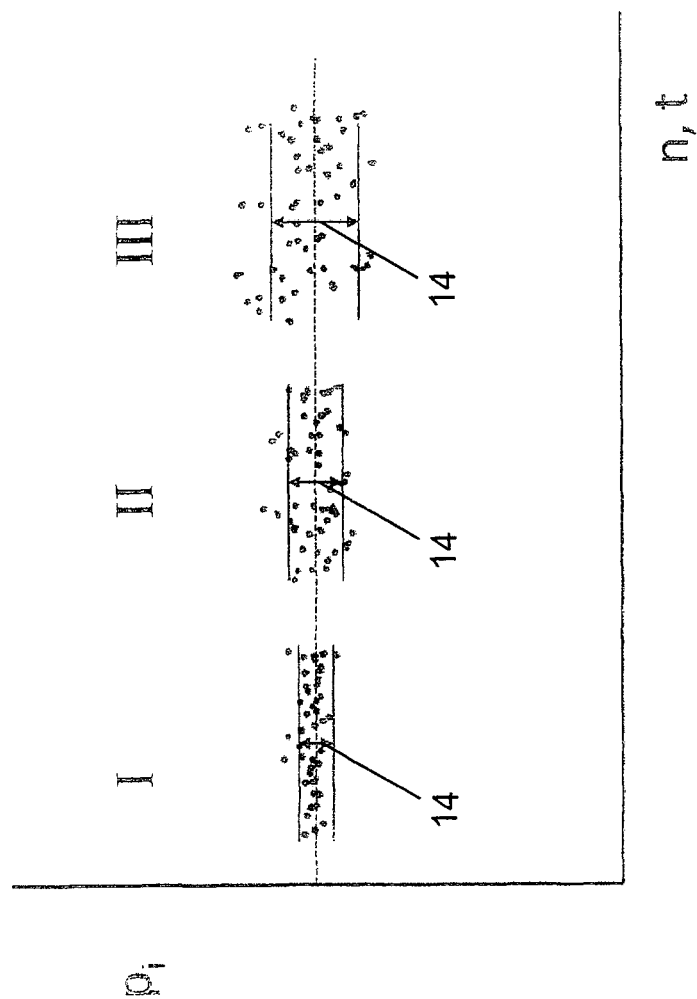

METHOD FOR OPERATING AT LEAST ONE PRECOMBUSTION CHAMBER-FIRED INTERNAL COMBUSTION ENGINE

The invention concerns a method of operating at least one prechamber-ignition internal combustion engine, in particular a stationary gas Otto cycle engine, comprising a prechamber and a main combustion chamber associated with the prechamber wherein a gas mixture is fed to the prechamber as a scavenging gas, wherein a synthesis gas produced in a fuel reformer and an engine fuel from an engine fuel source are fed to the scavenging gas, and wherein a combustion fuel and at least one further substance flow are fed to the fuel reformer for the reforming process.

In internal combustion engines which are operated on the basis of the Otto cycle ignition of a fuel-air mixture is effected in the combustion chamber by ignition devices, wherein mixture ignition is generally initiated by a spark flash-over at the electrodes of a spark plug. Alternatively it is also known to use a laser spark plug as the ignition device, in which case the required ignition energy is introduced into the combustion chamber in the form of laser light. Particularly in gas engines in which a fuel gas-air mixture is ignited the lean burn concept is used in relation to larger combustion chamber volumes. That means that there is a relatively great air excess, whereby at maximum power density and at the same time with a high level of efficiency of the engine pollutant emission and the thermal loading on the components is minimized. Ignition and combustion of very lean fuel-air mixtures represents in that case a considerable challenge for development and operation of modern high-power gas engines.

As from a certain structural size of the gas engines (generally approximately above six liters capacity) it is necessary to use ignition boosters in order to pass through the correspondingly long flame paths in the combustion chambers of the cylinders in the shortest possible time. Prechambers usually serve as such ignition boosters, wherein the fuel-air mixture which is highly compressed at the end of the compression stroke is ignited in a relatively small secondary chamber separated from the main combustion chamber of the cylinder. In that case a main combustion chamber is defined by the working piston, the cylinder barrel and the cylinder head surface, wherein the secondary chamber (the prechamber) is connected to the main combustion chamber by one or more flow transfer bores. Frequently such prechambers are scavenged or filled with engine fuel gas during the charge change phase to enrich the fuel-air mixture and thus improve the flame and combustion properties. For that purpose a small amount of engine fuel gas is branched from the engine fuel gas feed to the main combustion chamber and introduced into the prechamber by way of a suitable feed device provided with a non-return valve. That amount of engine fuel gas scavenges the prechamber during the charge change and is therefore often referred to as a scavenging gas.

During the compression phase the very lean fuel-air mixture of the main combustion chamber flows through the flow transfer bores into the prechamber and is there mixed with the scavenging gas. The ratio of engine fuel to air in the mixture is specified in the form of the air excess index $\lambda$. An air excess index of $\lambda=1$ means in that respect that the amount of air present in the mixture precisely corresponds to that amount required to permit complete combustion of the amount of engine fuel. In such a case combustion takes place stoichiometrically. Under full load large gas engines are usually operated lean with a $\lambda$ of between about 1.9 and 2.0, that is to say the amount of air in the mixture approximately corresponds to double the stoichiometric amount of air. Scavenging of the prechamber with engine fuel gas, after mixing with the engine fuel gas-air mixture from the main combustion chamber, gives a mean $\lambda$ in the prechamber of between about 0.8 and 0.9. That affords optimum flame production conditions and by virtue of the energy density intensive ignition flares which issue into the main combustion chamber and which lead to the fuel-air mixture in the main combustion chamber rapidly burning through. With such $\lambda$ values combustion however takes place at a maximum temperature level so that the wall temperatures in the prechamber region are also correspondingly high. That results on the one hand in a correspondingly high thermal load on the prechamber and the components arranged therein (for example spark plug, valves) and on the other hand unwantedly high nitrogen oxide emissions.

Enrichment of the scavenging gas with reactive gases makes it possible to lean off the scavenging gas with the same ignition quality. Making the prechamber gas leaner results in more advantageous emissions. It is known from the state of the art for the scavenging gas to be fed to a prechamber to be enriched with suitable gases in order to increase the ignition quality of the scavenging gas in lean-burn operation of the internal combustion engine. Thus U.S. Pat. No. 6,739,289 B2 discloses a method of enriching a prechamber scavenging gas with hydrogen. In that case the engine fuel for the prechamber is passed through a reformer to enrich the engine fuel with hydrogen. Known thermo-chemical reactors such as for example steam reformers can be used as the reformer.

Mixing the synthesis gas flow with a second gas flow (mixture or gas) for adjusting a given combustion air ratio lambda in the scavenging gas is also known. U.S. Pat. No. 6,739,289 B2 proposes mixing the synthesis gas flow with a second gas flow (mixture or gas) for setting a given lambda in the scavenging gas. A disadvantage with that solution is that the reformer is operated at a constant through-put and only the air ratio lambda in the scavenging gas is adjusted.

As the reformer represents a power consumer in terms of chemical energy it is desirable for only as much to be reacted as is actually required to influence the combustion behavior and emission levels.

The object of the present invention is to avoid the above-described disadvantages and to provide a method of operating a prechamber-ignition internal combustion engine, that is improved over the state of the art.

The above-described object is attained by a method having the features according to a first aspect of the invention. Advantageous embodiments of the invention are recited in the appendant claims.

According to the invention it is therefore provided that at least one operating parameter of the at least one internal combustion engine is monitored, wherein the chemical composition of the scavenging gas is modified by a change in the mass flow of the at least one further substance flow in dependence on a change in the at least one operating parameter.

It is possible in that way in particular to provide that a chemical composition for the scavenging gas, that is optimum for a respective operating point of the internal combustion engine, can be achieved to attain an optimum combustion behavior and low emission levels.

It is therefore also possible to implement a reliable and economical operation of an engine installation with reforming device, in which only as much synthesis gas as is respectively actually required for influencing the combustion behavior and the emission levels is produced by regulation of the substance flows for the reformer in dependence on the currently prevailing engine parameters.

Preferably at least one of the following further substance flows can be fed to the fuel reformer: water and/or water vapor and/or air and/or an engine fuel-air mixture and/or an exhaust gas of the at least one internal combustion engine.

In a preferred embodiment it can be provided that a first operating parameter is monitored based on a variation coefficient of the indicated mean effective pressure in the main combustion chamber.

The indicated mean effective pressure in a main combustion chamber is the mean value of the measured internal cylinder pressure over a combustion cycle. To ascertain the variation coefficient it is possible to use suitable devices (for example cylinder pressure sensor in the main combustion chamber) to detect a measurement series of the respective indicated mean effective pressure in the main combustion chamber over a plurality of combustion cycles, for example over 50 combustion cycles. Then, the arithmetic mean value and the empirical standard deviation can be ascertained from the measurement values of the indicated mean effective pressure in the main combustion chamber of a measurement series. The quotient of standard deviation and mean value then gives the variation coefficient of the indicated mean effective pressure in the main combustion chamber associated with the prechamber.

In that respect the variation coefficient of a main combustion chamber or the arithmetic mean value of the variation coefficients of all main combustion chambers of the internal combustion engine can be monitored as the first operating parameter.

The variation coefficient of a measurement series of measurement values of the indicated mean effective pressure over a plurality of or all main combustion chambers of the internal combustion engine can also be monitored as the first operating parameter.

The variation coefficient which is usually specified in percent is a measurement in respect of the stability of combustion and is dependent on engine settings, for example the levels of NOx emission. The usual values for the variation coefficient in operation using natural gas are for example between 1.2% and 1.4% at 500 mg/Nm$^3$ (milligram per normal cubic meter) NOx emissions and between 2.5% and 2.6% at 250 mg/Nm$^3$ NOx emissions. The variation coefficient is thus heavily dependent on the operating point of the internal combustion engine. The lower the levels of NOx emissions the correspondingly higher is the variation coefficient.

The variation coefficient can be used as a measurement in respect of combustion stability. The lower the variation coefficient, the correspondingly more stable and more uniform is combustion and correspondingly higher is the level of efficiency of the internal combustion engine. Thus for example with a variation coefficient of 1% combustion can be viewed as stable, while with a variation coefficient of between 3% and 4% the engine is near its running limit and is therefore running in an unstable fashion.

In a particularly preferred embodiment it can be provided that the chemical composition of the scavenging gas is modified if the first operating parameter exceeds a predeterminable first limit value. In other words therefore it is possible to establish a first limit value at which intervention to improve combustion can or should be effected.

The first limit value for the variation coefficient can be set for example at 2.5%, preferably 2.75%. The first limit value can generally also be established in engine-specific fashion.

It can be provided that when the first limit value is exceeded the mass flow of the water vapor and/or the mass flow of the air and/or the mass flow of the exhaust gas is or are increased, preferably proportionally to the change in the first operating parameter. Particularly in operation of the internal combustion engine with exhaust gas recycling it may be desirable in that case to increase the exhaust gas mass flow. In operation without exhaust gas recycling it may be sufficient to increase the mass flow of the water vapor and/or the mass flow of the air.

In that way in particular the ratio of the mass flows of the reformer input flows water vapor and fuel can be modified. Below the first limit value however that ratio can remain unchanged at a design-specific normal value. For example the composition of the scavenging gas at the design-specific normal value is such that it has a hydrogen proportion of 10-35% by volume and a methane proportion of 10-35% by volume.

Overall more hydrogen can be achieved in the scavenging gas with the step of increasing the mass flows of the specified substances. It is possible in that way to achieve a higher combustion speed and thus a higher level of stability in combustion.

By a change in the respective mass flows of the substance flows, the mass flow of the scavenging gas is also correspondingly modified, that is to say an increase in a mass flow of a substance flow also leads to an increase in the mass flow of the scavenging gas and a reduction in a mass flow of a substance flow leads to a reduction in the mass flow of the scavenging gas.

In a preferred development it can also be provided that the mass flow of the engine fuel is modified. The chemical composition of the scavenging gas can also be modified in that way. It can be provided that the mass flow of the engine fuel is reduced when the first limit value is exceeded. Thus, in conjunction with above-mentioned change in the mass flows of the reformer input substance flows for example the mass flow of the scavenging gas can thus be kept constant and in that way the hydrogen proportion in the scavenging gas can be increased.

The first limit value can be dependent on a power output and/or a charge pressure of the at least one internal combustion engine and/or on a charge air temperature or the temperature of a fuel-air mixture upstream of the inlet valves into the main combustion chamber of the at least one internal combustion engine.

It has proven to be particularly advantageous in that respect if the first limit value is altered, preferably increased, with increasing load and/or increasing charge pressure of the at least one internal combustion engine.

In a further embodiment it can be provided that upon acceleration and/or in the idle mode and/or under a low partial load of the at least one internal combustion engine the proportion of synthesis gas in the scavenging gas is kept as low as possible for reasons of economy of the overall system. In that case reformer operation can be reduced to a reasonable minimum, for example to 30% of the reformer input substance flows in relation to the design-specific normal value. Upon acceleration to full load the proportion of synthesis gas in the scavenging gas can be raised to the target composition at the design-specific normal value.

In a further embodiment it can be provided that a second operating parameter is monitored based on a spark plug temperature of a spark plug in the prechamber.

In that respect an aim is to keep the temperature at the spark plug in an economically optimum region under given boundary conditions (operating point of the internal combustion engine in respect of NOx emission and load). In that case the temperature at the spark plug should be as low as possible, with as little synthesis gas as possible being required.

In that respect the electrode temperature of the spark plug can be monitored as the second operating parameter. Detection of the electrode temperature can be effected in known manner for example by a thermocouple on the ground electrode of the spark plug. Usual values in respect of electrode temperature in the case of prechamber-ignition internal combustion engines operating on natural gas are between 830° C. and 850° C. The electrode temperature can be markedly reduced, for example by 100° C., by the scavenging gas being of a suitable chemical composition. A lower electrode temperature results in a lower level of component loading and thus an increased service life, in particular an increased spark plug life.

It can therefore be provided that the chemical composition of the scavenging gas is modified if the second operating parameter exceeds a predeterminable second limit value. In particular, the mass flow of the water vapor and/or the mass flow of the air and/or the mass flow of the exhaust gas can be increased when the second limit value is exceeded.

Particularly in operation of the internal combustion engine with exhaust gas recycling it may be appropriate to increase the mass flow of the exhaust gas in that case. In operation without exhaust gas recycling it may be sufficient to increase the mass flow of the water vapor and/or the mass flow of the air.

To reduce the electrode temperature it may also be provided that the mass flow of the combustion fuel and/or the mass flow of the engine fuel is or are reduced.

The second limit value can be set for example at 750° C. In particular in that case the aim of adaptation of the chemical composition of the scavenging gas is to slightly reduce the calorific value of the scavenging gas or increase the proportion of hydrogen.

It may also be desirable to monitor the ignition voltage requirement of a spark plug in the prechamber as that value can provide information about the spark plug wear.

Therefore it can preferably be provided that a third operating parameter is monitored based on an ignition voltage requirement of a spark plug in the prechamber, wherein the chemical composition of the scavenging gas is modified if the third operating parameter exceeds a predeterminable third limit value. In particular the mass flow of the engine fuel can be increased when the third limit value is exceeded.

The ignition voltage requirement which can be detected for example by an engine management system is dependent on the composition of the scavenging gas. The $CH_4$ proportion in the scavenging gas is increased by an increase in the engine fuel mass flow, whereby ignitability of the scavenging gas can be increased. Progressive spark plug wear can be detected by way of an increased ignition voltage requirement and the chemical composition of the scavenging gas can be accordingly adapted to be able to cause reliable ignition of the scavenging gas in spite of a longer spark path.

The proposed method can also be employed in relation to a multi-engine installation. In that respect there can be provided at least two internal combustion engines, wherein synthesis gas of the fuel reformer is fed to the prechambers of the at least two internal combustion engines optionally with admixing of engine fuel in each case as the scavenging gas. In that respect it can preferably be provided that a fourth operating parameter is monitored based on the load and/or the charge pressure of at least one of the at least two internal combustion engines, wherein the mass flow of the scavenging gas is modified in dependence on a change in the fourth operating parameter.

The mass flow of the scavenging gas or the scavenging gas amount usually involves a basic setting in relation to the mass or volume flows of the input substance flows for the reformer and in relation to the engine fuel which can form the scavenging gas jointly with the synthesis gas from the reformer. The basic setting in that case is generally such that the scavenging gas amount corresponds to about 1.5 times the prechamber gas requirement (volume of all prechambers in total according to the combustion cycle).

Now in operation the scavenging gas amount can be so adjusted that it is modified in dependence on a change in the load of at least one of the at least two internal combustion engines (as the fourth operating parameter). In that respect it can also be provided that the scavenging gas amount is modified in dependence on a change in the total load of all internal combustion engines in a multi-engine installation (as the fourth operating parameter). The scavenging gas amount in that case can be suitably modified for example by way of suitable regulating fittings for mass or volume flows for the input substance flows for the reformer and the engine fuel.

The scavenging gas amount can also be so set that the pressure of the scavenging gas downstream of a scavenging gas compressor by which the scavenging gas can be compressed before being introduced into the prechambers is always higher by a given amount than the charge pressure of the fuel-air mixture for the main combustion chambers of the internal combustion engine. In that way changes in the engine load can also be taken into consideration by way of the dependency on the charge pressure. In that respect a suitable difference between charge pressure and scavenging gas pressure is for example 50 mbars, that is to say the pressure of the scavenging gas downstream of a scavenging gas compressor can be trackingly adjusted to the charge pressure so that it is always 50 mbars higher than the charge pressure. Rapid adaptation of the scavenging gas pressure can be effected for example by a suitably regulated bypass line. The bypass line in that case communicates a scavenging gas line through which the scavenging gas is introduced into the prechambers with an engine fuel line through which for example the fuel-air mixture is introduced into the main combustion chambers. In principle it can also be provided that a change in the scavenging gas amount is effected in dependence on a change in the charge pressure, preferably proportionally to a change in the charge pressure. In that way fluctuations in the charge pressure and in particular in the case of a multi-engine installation with a common reformer the demands of individual internal combustion engines can be compensated.

Operation of a multi-engine installation can also be such that the reformer input substance flows are modified in dependence on the total load of all internal combustion engines in a multi-engine installation and fine regulation of the scavenging gas composition and amount is effected individually for each internal combustion engine in relation to the respective charge pressure of the internal combustion engines.

In general the following operating parameters for suitable for monitoring to adjust an optimum scavenging gas composition and amount in relation to the change therein and thus to achieve an optimum operating condition for the internal combustion engine or multi-engine installation: all delivered electric power of all internal combustion engines of a multi-engine installation, charge pressures of the individual internal combustion engines, variation coefficients in the indicated mean effective pressure of the main combustion chambers of the individual internal combustion engines, temperatures at the respective ground electrodes of the spark plugs of the individual internal combustion engines, and ignition voltage requirement of the respective spark plugs of the individual internal combustion engines.

At least one of the following parameters of the fuel reformer can also be modified in dependence on a change in at least one of the above operating parameters of the internal combustion engine: temperature and/or pressure of the at least one substance flow at the input of the fuel reformer, temperature in the fuel reformer, temperature at the outlet from the fuel reformer, CO concentration in the synthesis gas, $CO_2$ concentration in the synthesis gas, mass flow of the combustion fuel and mass flow of the exhaust gas.

BRIEF DESCRIPTION OF THE DRAWINGS

Further details and advantages of the present invention will now be described by means of the specific description hereinafter. In the drawing:

FIG. 3 shows measurement values in respect of the indicated mean effective pressure in a main combustion chamber of an internal combustion engine.

DETAILED DESCRIPTION OF PREFERRED EMBODIMENTS

Figure 1:
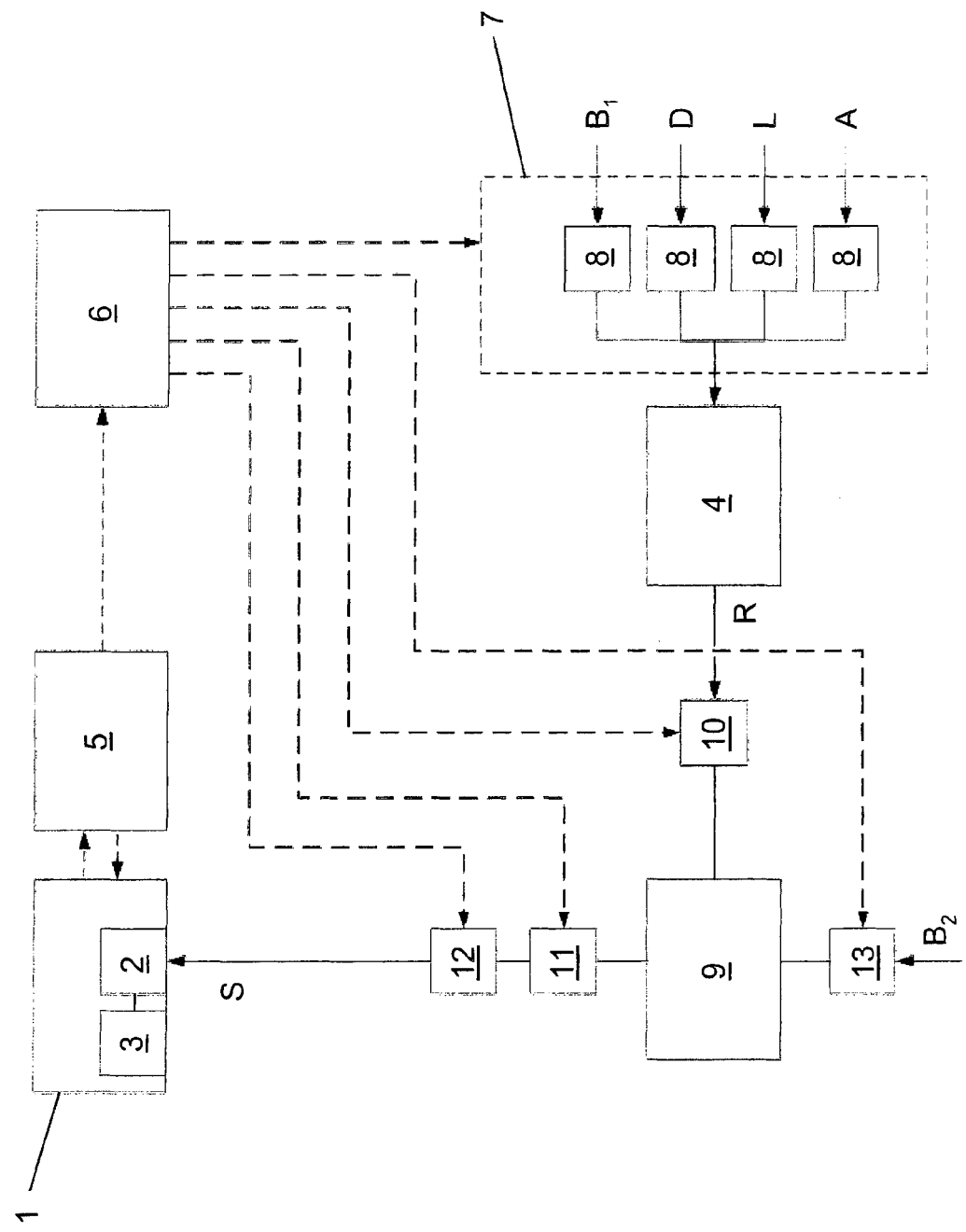
FIG. 1 shows a schematic block circuit diagram of an internal combustion engine with reformer and scavenging gas regulator.

FIG. 1 shows a diagrammatic view of an internal combustion engine 1 having a prechamber 2 and a main combustion chamber 3 associated with the prechamber 2. A scavenging gas S is fed to the prechamber 2. That scavenging gas S includes a synthesis gas R and an engine fuel $B_2$. The synthesis gas R and the engine fuel $B_2$ are mixed in a scavenging gas mixer 9 and the resulting gas mixture is fed as a scavenging gas S to the prechamber or prechambers 2 of the internal combustion engine 1.

In that case the synthesis gas R is produced in a fuel reformer 4. For the per se known reforming process in which a hydrocarbon-bearing combustion fuel $B_1$ reacts to give an $H_2$- and CO-bearing synthesis gas R a plurality of substance flows $B_1$, D, L, A are fed to the fuel reformer 4. In this example those substance flows $B_1$, D, L, A are fed by way of a substance flow mixer 7 which mixes the substance flows $B_1$, D, L, A fed thereto to give a substance flow mixture and feeds same to the fuel reformer 4.

The combustion fuel $B_1$ for the fuel reformer 4 which can be an autothermal chemical reactor can in that case be for example natural gas from a natural gas supply (for example a natural gas pipeline). The engine fuel $B_2$ which is fed to the scavenging gas S in the scavenging gas mixer 9 can originate from the same combustion fuel source as the combustion fuel $B_1$ or also from an engine fuel source separate therefrom.

This example has an engine management system 5 for monitoring the internal combustion engine 1 which for example can be a stationary gas Otto cycle engine. That engine management system 5 can detect and suitably evaluate operating data of the internal combustion engine 1. Operating data or operating parameters of the internal combustion engine 1, that can be monitored by the engine management system 5, are for example: the variation coefficient in the indicated mean effective pressure in the main combustion chamber 3, the electrode temperature of a spark plug in the prechamber 2, the ignition voltage requirement of a spark plug in the prechamber 2, the power of the internal combustion engine 1, the charge pressure of the charge air or the fuel-air mixture for the main combustion chamber 3, the charge pressure of the scavenging gas S for the prechamber 2 or the temperature of the charge air or the fuel-air mixture for the main combustion chamber 3.

The scavenging gas S can be influenced in dependence on a change in at least one monitored operating parameter of the internal combustion engine 1. Provided for that purpose is a scavenging gas regulator 6 to which the monitored operating parameters of the internal combustion engine 1 can be passed as input signals. The operating parameters fed to the scavenging gas regulator 6 (for example the variation coefficient of the indicated mean effective pressure in the main combustion chamber 3) can originate from the engine management system 5 or can be communicated as signals directly from suitable monitoring devices (for example sensors) at the internal combustion engine 1 to the scavenging gas regulator 6.

The chemical composition of the scavenging gas S can be modified by means of the scavenging gas regulator 6. The scavenging gas regulator 6 can send signals to various devices to influence them by way of suitable signal lines (shown in broken line). The devices which can be influenced by the scavenging gas regulator 6 are for example the substance flow mixer 7 or the volume regulating devices 8 thereof for the substance flows $B_1$, D, L, A, an engine fuel volume regulating device 13, a synthesis gas regulating device 10, a scavenging gas regulating device 11 or a scavenging gas volume regulating device 12. The chemical composition of the scavenging gas S and/or at least one physical parameter of the scavenging gas S (for example pressure, temperature and mass flow) can be modified by influencing one or more of the described devices 8, 13, 10, 11, 12.

In particular it is possible to provide in that way that a variation coefficient of the indicated mean effective pressure in the main combustion chamber 3 is monitored and a mass flow of the at least one substance flow $B_1$, D, L, A is modified in dependence on a change in the variation coefficient. In that case a change in the mass flows of the substance flows $B_1$, D, L, A can be effected by means of per se known volume regulating devices 8 like for example valves. For that purpose the scavenging gas regulator 6 sends suitable control signals to the volume regulating devices 8 of the substance flows $B_1$, D, L, A.

Preferably operation can be implemented in such a way that, when a predeterminable first limit value of the monitored variation coefficient is exceeded, the mass flows of the water vapor D and the air L are increased. As a result the fuel reformer 4 produces more hydrogen. Particular in operation of the internal combustion engine 1 with exhaust gas recycling the mass flow of the exhaust gas A can also be increased.

The chemical composition of the scavenging gas S can also be modified by the mass flow of the engine fuel $B_2$ being altered. By a change in the mixing ratio of engine fuel $B_2$ and synthesis gas R in the scavenging gas mixer 9 it is possible to influence the chemical composition of the scavenging gas S in specifically targeted fashion. In that case adjustment of the desired mixing ratio of engine fuel $B_2$ and synthesis gas R can be effected by the scavenging gas regulator 6 and in dependence on a change in the monitored operating parameter, for example by a change in the mass flow of the engine fuel $B_2$ by means an engine fuel volume regulating device 13 (for example a metering valve).

For further advantageous influences on the scavenging gas S it can also be provided that for example the temperature and/or the water content of the synthesis gas R is influenced by the scavenging gas regulator 6. It can preferably also be provided that the temperature, pressure and amount of the scavenging gas S introduced into the prechamber 2 is altered by the scavenging gas regulator 6. A change in temperature and water content of the synthesis gas R can be effected for example by means of at least one synthesis gas regulating device 10. That can involve per se known heat exchangers or cooling devices or condensate separation devices.

For example the temperature and/or the pressure of the scavenging gas S can be modified by the scavenging gas regulator 6, by means of at least one scavenging gas regulating device 11. The scavenging gas regulating device 11 can be for example a heat exchanger and/or a compressor. A known scavenging gas volume regulating device 12, like for example a metering valve, can be used to modify the mass flow of the scavenging gas S to be fed into the prechamber 2.

Figure 2:
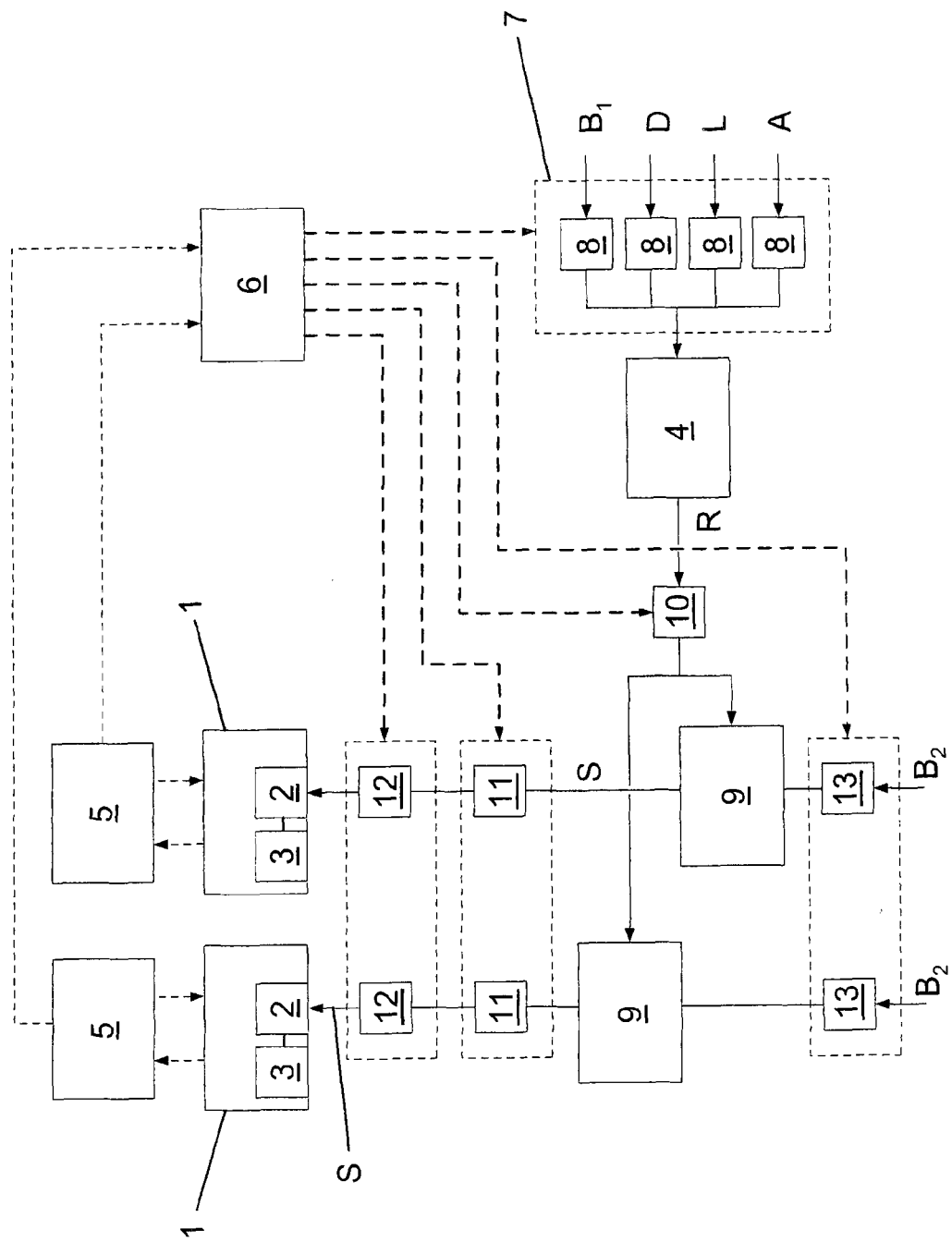
FIG. 2 shows a schematic block circuit diagram of a multi-engine installation with a reformer and a scavenging gas regulator.

FIG. 2 shows a schematic block circuit diagram as shown in FIG. 1 for the situation involving a multi-engine installation. Two internal combustion engines 1 are shown in this example. The scavenging gas S for the prechambers 2 of these internal combustion engines 1 is respectively composed of synthesis gas R from a fuel reformer 4 and engine fuel $B_2$ which is respectively added to the synthesis gas R in a scavenging gas mixer 9 associated with an internal combustion engine 1. In that way a fuel reformer 4 can produce synthesis gas R for a plurality of internal combustion engines 1. The chemical composition and/or at least one physical parameter of the scavenging gas S can be modified individually for each internal combustion engine 1 in specifically targeted fashion by a change in the reformer input substance flows $B_1$, D, L, A by means of volume regulating devices 8 and by means of the above-described devices 13, 10, 11, 12. In the illustrated example operating parameters of an internal combustion engine 1 are respectively monitored by the engine management system 5 associated with the internal combustion engine 1 and corresponding signals are communicated to the scavenging gas regulator 6. The scavenging gas regulator 6 can evaluate those signals and in dependence on a change in at least one operating parameter of at least one of the internal combustion engines 1 can implement suitable interventions at the devices 8, 13, 10, 11, 12 in order to modify the respective chemical composition and/or at least one physical parameter of the scavenging gas S which is fed to the prechambers 2 of a respective internal combustion engine 1.

FIG. 3 shows a diagram with measurement values of the indicated mean effective pressure in a main combustion chamber 3 of the internal combustion engine 1. The x-axis of the diagram represents time t and measurement value n respectively. The respective indicated mean effective pressure $p_i$ of a measurement value n is represented on the y-axis of the diagram. The diagram shows three measurement series I, II and III. With the measurement values n of the measurement series I the values for the indicated mean effective pressures $p_i$ fluctuate comparatively little about the arithmetic mean value of the indicated mean effective pressures $p_i$ (dashed line). In comparison therewith measurement series II and III show measurement values n at which the values for the respective indicated mean effective pressures $p_i$ differ more greatly from each other. The arithmetic mean value and the empirical standard deviation of the indicated mean effective pressures $p_i$ is respectively ascertained for each measurement series I, II and III. The quotient of the empirical standard deviation and the arithmetic mean value respectively gives the variation coefficient for the respective measurement series I, II, III. The double-headed arrows 14 respectively show the doubled variation coefficient for the respective measurement series I, II, III.

The invention claimed is:

1. A method of operating at least one prechamber-ignition internal combustion engine comprising a prechamber and a main combustion chamber associated with the prechamber, the method comprising:
   feeding a combustion fuel and at least one further substance flow to a fuel reformer for a reforming process;
   mixing a synthesis gas produced in the fuel reformer and an engine fuel from an engine fuel source to produce a scavenging gas, mixture;
   feeding the scavenging gas to the prechamber;
   monitoring at least one operating parameter of the at least one internal combustion engine; and
   modifying a chemical composition of the scavenging gas by changing a mass flow of the at least one further substance flow in dependence on a change in the at least one operating parameter.

2. The method as set forth in claim 1, wherein the at least one substance flow fed to the fuel reformer comprises one or more of water, water vapor, air, an engine fuel-air mixture, and an exhaust gas of the at least one internal combustion engine.

3. The method as set forth in claim 1, wherein the monitoring of at least one operating parameter comprises monitoring a first operating parameter based on a variation coefficient of an indicated mean effective pressure in the main combustion chamber, and
   wherein the modifying of the chemical composition of the scavenging gas in dependence on a change in the at least one operating parameter comprises modifying the chemical composition of the scavenging gas when the first operating parameter exceeds a predeterminable first limit value.

4. The method as set forth in claim 3, wherein the at least one further substance flow fed to the fuel reformer comprises one or more of water vapor, air, and an exhaust gas of the at least one internal combustion engine, and
   wherein the changing of the mass flow of the at least one further substance flow comprises increasing a mass flow of at least one of the water vapor, the air, and the exhaust gas.

5. The method as set forth in claim 4, wherein the increase of the mass flow of at least one of the water vapor, the air, and the exhaust gas is proportional to a change in the first operating parameter.

6. The method as set forth in claim 3, further comprising altering a mass flow of the engine fuel when the first operating parameter exceeds the first limit value.

7. The method as set forth in claim 6, wherein the altering of the mass flow of the engine fuel comprises reducing the mass flow of the engine fuel when the first operating parameter exceeds the first limit value.

8. The method as set forth in claim 3, further comprising altering the first limit value with increasing load and/or increasing charge pressure of the at least one internal combustion engine.

9. The method as set forth in claim 8, wherein the altering of the first limit value comprises increasing the first limit value with increasing load and/or increasing charge pressure of the at least one internal combustion engine.

10. The method as set forth in claim 1, wherein the monitoring of at least one operating parameter comprises monitoring a second operating parameter based on a spark plug temperature of a spark plug in the prechamber, and
wherein the modifying of the chemical composition of the scavenging gas in dependence on a change in the at least one operating parameter comprises modifying the chemical composition of the scavenging gas when the second operating parameter exceeds a predeterminable second limit value.

11. The method as set forth in claim 10, wherein the at least one further substance flow fed to the fuel reformer comprises one or more of water vapor, air, and an exhaust gas of the at least one internal combustion engine, and
wherein the changing of the mass flow of the at least one further substance flow comprises increasing a mass flow of at least one of the water vapor, the air, and the exhaust gas.

12. The method as set forth in claim 10, further comprising reducing a mass flow of the combustion fuel and/or a mass flow of the engine fuel.

13. The method as set forth in claim 1, wherein the monitoring of at least one operating parameter comprises monitoring a third operating parameter based on an ignition voltage requirement of a spark plug in the prechamber, and
wherein the modifying of the chemical composition of the scavenging gas in dependence on a change in the at least one operating parameter comprises modifying the chemical composition of the scavenging gas when the third operating parameter exceeds a predeterminable third limit value.

14. The method as set forth in claim 13, further comprising increasing a mass flow of the engine fuel when the third limit value is exceeded.

15. The method as set forth in claim 1, wherein the at least one internal combustion engine comprises at least two internal combustion engines, and wherein synthesis gas of the fuel reformer is fed to the prechambers of the at least two internal combustion engines optionally with admixing of engine fuel in each case as the scavenging gas.

16. The method as set forth in claim 15, wherein the monitoring of at least one operating parameter comprises monitoring a fourth operating parameter based on a load and/or a charge pressure of at least one of the at least two internal combustion engines,
and wherein a mass flow of the scavenging gas is modified in dependence on a change in the fourth operating parameter.

17. The method as set forth in claim 1, wherein the at least one prechamber-ignition internal combustion engine is a stationary gas Otto cycle engine.

* * * * *